United States Patent
Belsley et al.

(10) Patent No.: US 10,564,285 B2
(45) Date of Patent: Feb. 18, 2020

(54) ESTIMATION OF MOTION IN SIX DEGREES OF FREEDOM (6DOF) USING LIDAR

(71) Applicant: DSCG SOLUTIONS, INC., Chantilly, VA (US)

(72) Inventors: Kendall Belsley, Falls Church, VA (US); Richard Sebastian, Frederick, MD (US)

(73) Assignee: DSCG Solutions, Inc., Frederick, MD (US)

( * ) Notice: Subject to any disclaimer, the term of this patent is extended or adjusted under 35 U.S.C. 154(b) by 432 days.

(21) Appl. No.: 15/354,327

(22) Filed: Nov. 17, 2016

(65) Prior Publication Data

US 2017/0146656 A1    May 25, 2017

Related U.S. Application Data

(60) Provisional application No. 62/257,523, filed on Nov. 19, 2015.

(51) Int. Cl.
```
G01C 3/08      (2006.01)
G01S 17/66     (2006.01)
G01S 17/58     (2006.01)
```
(52) U.S. Cl.
CPC .............. *G01S 17/66* (2013.01); *G01S 17/58* (2013.01)

(58) Field of Classification Search
CPC .......... G01S 17/66; G01S 17/42; G01S 17/58; G01S 17/89; G01S 7/4815
See application file for complete search history.

(56) References Cited

U.S. PATENT DOCUMENTS

| | | |
|---|---|---|
| 6,246,468 B1 | 6/2001 | Dimsdale |
| 9,188,676 B2 | 11/2015 | Zheleznyak |
| 2010/0208234 A1 | 8/2010 | Kaehler |
| 2015/0160332 A1 | 6/2015 | Sebastian et al. |

OTHER PUBLICATIONS

International Search Report and Written Opinion received for PCT Patent Application No. PCT/US2016/062732, dated Jan. 24, 2017, 9 pages.
Extended European Search Report for European Application No. 16867208.7, dated Jul. 5, 2019, 8 pages.

*Primary Examiner* — Samantha K Abraham
(74) *Attorney, Agent, or Firm* — Brake Hughes Bellermann LLP

(57) ABSTRACT

Techniques of tracking an object involve a Light Detection And Ranging (LIDAR) system. The LIDAR system can be configured to track an object over a period of time, during which the object is moving. Using the LIDAR system tracking of the object can be performed while eliminating illumination hardware (e.g., video camera hardware). Accordingly, the LIDAR system can be configured to operate in total darkness, into the sun, etc. The LIDAR system can be less susceptible to motion of the object than conventional systems. Accordingly, the full rigid-body motion of the object can be determined in some implementations solely from LIDAR measurements, without, for example, video.

20 Claims, 7 Drawing Sheets

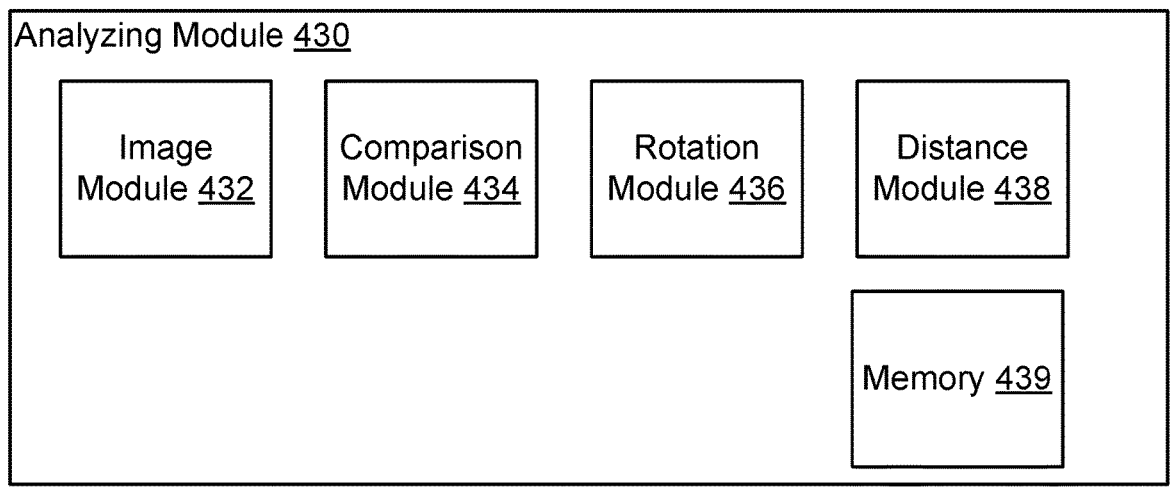
FIG. 5
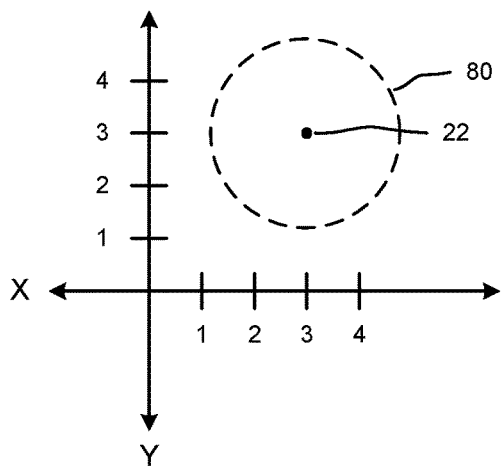 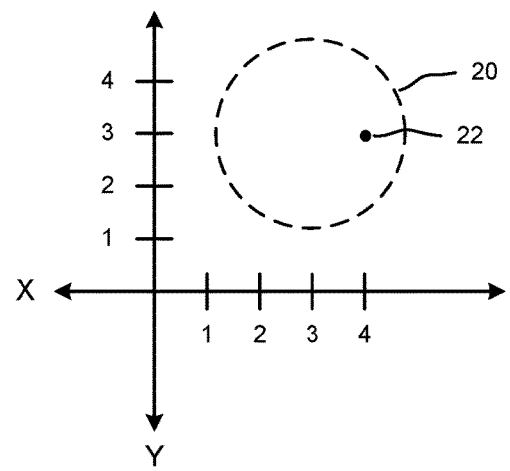
FIG. 6  FIG. 7

ESTIMATION OF MOTION IN SIX DEGREES OF FREEDOM (6DOF) USING LIDAR

TECHNICAL FIELD

This description relates to systems and methods for estimation of motion using Light Detection And Ranging (LIDAR).

BACKGROUND

In some known systems, objects may be tracked using a laser Light Detection And Ranging (LIDAR) system in conjunction with a video system. Some such known systems may be complex and difficult to use. Additionally, in some such known systems, the video system may require light in order to detect the object to be tracked. Thus, a need exists for systems, methods, and apparatus to address the shortfalls of present technology and to provide other new and innovative features.

BRIEF DESCRIPTION OF THE DRAWINGS

FIG. 5 is a schematic diagram that illustrates an example processor according to an implementation.

FIGS. 6 and 7 illustrate an object that may be tracked according to an implementation.

DETAILED DESCRIPTION

Figure 1:
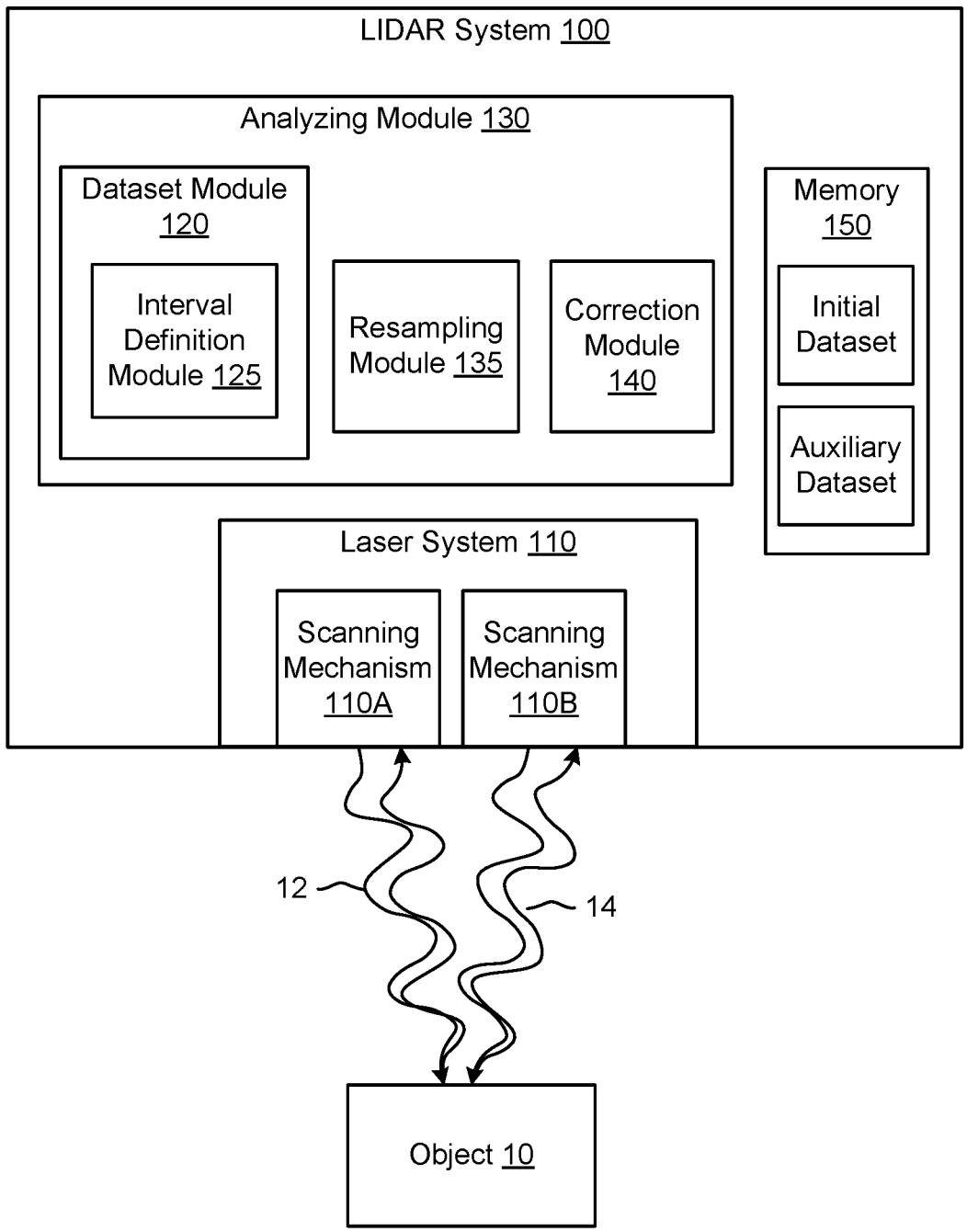
FIG. 1 is a diagram that illustrates a Light Detection And Ranging (LIDAR) system according to an aspect.

FIG. 1 is a diagram that illustrates a Light Detection And Ranging (LIDAR) system 100 according to an aspect. The LIDAR system 100 can be configured to track an object 10 over a period of time, during which the object 10 is moving. Using the LIDAR system 100 tracking of the object 10 can be performed while eliminating illumination hardware (e.g., video camera hardware). Accordingly, the LIDAR system 100 can be configured to operate in total darkness, into the sun, etc. The LIDAR system 100 can be less susceptible to motion of the object 10 than conventional systems. Accordingly, the full rigid-body motion of the object 10 can be determined in some implementations solely from LIDAR measurements, without, for example, video.

As shown in FIG. 1, the LIDAR system 100 includes an analyzing module 130, a memory 150, and a laser system 110. The laser system 110 includes two scanning mechanisms—scanning mechanism 110A and scanning mechanism 110B. The scanning mechanisms 110A, 110B are configured to be used together (e.g., used in tandem) to track the object 10. Using scans (e.g., datasets including datapoint representing the scans) by the two scanning mechanisms, the accuracy of tracking of the object 10 can be achieved in a relatively fast and accurate fashion. One or more of the scanning mechanisms 110A, 110B can be configured to scan along a horizontal direction (e.g., along a horizontal direction in a serpentine pattern, along a horizontal direction along a single line), along a vertical direction (e.g., along a vertical direction, along a vertical direction along a single line), and/or along another direction (e.g., a diagonal direction). In some implementations, the scanning direction and/or pattern performed by the scanning mechanism 110A, 110B can be the same or different.

A laser beam (e.g., electromagnetic radiation) emitted toward the object 10 from scanning mechanism 110A (e.g., a laser) is shown as 12A, and a laser beam emitted toward the object 10 from the scanning mechanism 110B is shown as 14A. Reflected laser beams, which can be analyzed by the analyzing module 130, are shown as 12B and 14B.

In general, the LIDAR system 100 is configured to scan a target over a period of time, during which the object 10 is moving. The LIDAR system 100 can be configured to determine 6 degree of freedom (DOF) trajectory parameters $v_x(t)$, $v_y(t)$, $v_z(t)$, $\omega_x(t)$, $\omega_y(t)$, $\omega_z(t)$ (also can be referred to as vx, vy, vz, ωx, ωy, and ωz). In some implementations, the collected x, y, z measured points can all be mapped to a single point of time to define a three-dimensional (3D) image of the subject at that time (where $v_x(t)$, $v_y(t)$, and $v_z(t)$ are the respective velocities of the object 10 in the x, y, and z Cartesian directions as a function of time, and $\omega_x(t)$, $\omega_y(t)$, and $\omega_z(t)$ are the respective rotations of the object 10 about the x, y, and z directions as a function of time). This image can be distorted if there are errors in the initial trajectory parameter estimates. In some implementations, the initial trajectory parameters can be based on a video scan.

Figure 2:
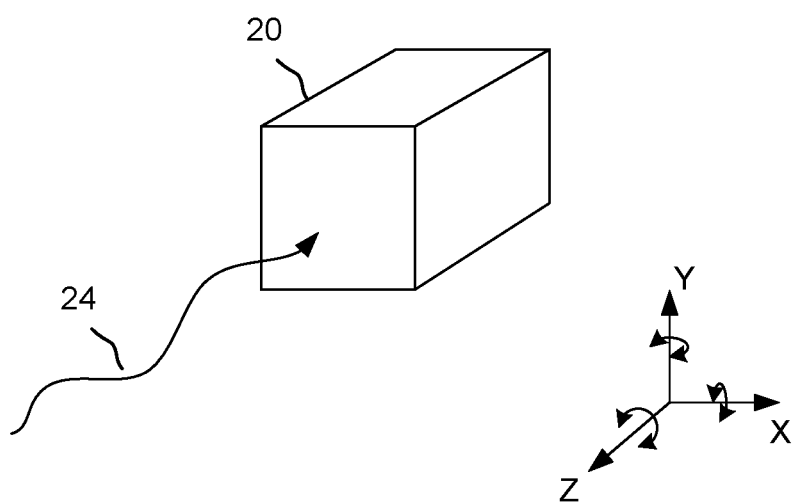
FIG. 2 illustrates a laser beam emitted along the z-direction toward an object.

The z-direction can be a direction along a laser beam, the x-direction can be orthogonal to the z-direction, and the y-direction can be orthogonal to the z-direction and the x-direction. The Cartesian orientation is shown in FIG. 2. FIG. 2 illustrates a laser beam 24 emitted along the z-direction toward an object 20. The x-direction and the y-direction, which are orthogonal to one another and are within the same plane, are both orthogonal to the z-direction. The rotational directions about each of the x, y, and z axes are illustrated with curved arrows.

Referring back to FIG. 1, the LIDAR system 100 is configured to define or refine 6DOF object 10 motion and image formation after first order (real-time) estimates have been used to form an initial object 10 image. For example, the LIDAR system 100 can be configured to obtain an indirect estimation of some of the 6DOF parameters based on direct estimates of some of the 6DOF parameters. In some implementations, it can be assumed that at least a portion of the 6DOF parameters, such as the 6DOF parameters that are directly estimated are correct or accurate (e.g., substantially correct or accurate). Accordingly, a first subset of the 6DOF parameters can be determined and/or adjusted based on a second subset of the 6DOF parameters that are assumed to be correct or accurate. As a specific example, a set of three of the 6DOF parameters—vx, vy, and wz—can be indirectly determined and/or corrected based on direct estimates of a separate set (e.g., mutually exclusive set) of three of the 6DOF parameters—vz, ωx, and ωy.

As noted above, the LIDAR system 100 includes independent scanning mechanisms—scanning mechanisms 110A and 110B, which can be used to produce overlapping scanning areas (e.g., overlapping in time, over the same time period) of the object 10 that can be used to accurately determine the 6DOF parameters. In some implementations, the LIDAR system 100 can include a redundant scanning mechanism (e.g., a single scanning mechanism that scans an area multiple times) that can be used to produce overlapping scanning areas of the object 10 that can be used to accurately determine the 6DOF parameters. In some implementations, for example, the scanning mechanism 110A can be configured to scan the object 10 along a horizontal direction and the scanning mechanism 110B can be configured to scan the object 10 along the vertical direction. The LIDAR system 100 is configured to emit at least two beams, or sets of beams, each beam, or set of beams, being scanned in a separate scan pattern, and each pattern having one or more overlap regions.

In some implementations, the two or more laser beams (or scanning mechanisms 110A, 110B) may be deployed with separate, independent scan patterns. These scan patterns may be configured such that parts of the patterns overlap and the two (or more) beams make measurements of the same position (or positions), either at the same time or at closely spaced times (e.g. within the same scan cycle). Measurements from the two (or more) beams may be used together to estimate motion of the object 10 in two different directions (e.g. horizontal and vertical directions). For example, if the features and motion of the object 10 allow for a horizontal scanning beam to accurately determine the horizontal motion of the object, then this horizontal motion may be removed, or backed out, along with rotation and z-motion. Having performed this motion removal, a vertical scanning beam whose scan pattern overlaps the horizontal scan pattern may be used to more accurately determine vertical motion than would otherwise be possible without the horizontal scanning beam and the overlapping measurements that tie the two beam measurements together.

A method that can be implemented using the LIDAR system 100 is described below. In some implementations, a variety of methods for tracking (and accurately calculating 6DOF parameters) can be performed using one or more scanning mechanisms, and the methods described herein are examples of such methods.

An initial image (e.g., a global image, an initial 3-dimensional (3D) image) of the object 10 can be defined using one or more of the scanning mechanisms 110A, 110B included in the LIDAR system 100. Initial estimates of location and motion (e.g., velocity in a direction (e.g., along an x-direction), rotation about a direction (e.g., a rotation about a y-axis) can be used to define the initial image which can be represented by a dataset. In some implementations, the initial estimates can be defined using one of the scanning mechanisms 110A and can be a global image or scan represented by an initial dataset. In some implementations, the initial estimates can be referred to as initial trajectory estimates, first order estimates (or as a first order image) and can include all, or a subset of, 6DOF parameters. More details related to formation of these initial estimates are described below in connection with at least FIGS. 4-11.

The initial dataset (e.g., initial dataset shown in FIG. 1 and stored in the memory 150) can be compared with subsequent, or concurrent, but auxiliary scan(s) and associated auxiliary dataset(s) (e.g., auxiliary dataset shown in FIG. 1 and stored in the memory 150) to define, and/or further refine the 6DOF parameters. In some implementations, the initial dataset can represent a scan performed along a first direction and the auxiliary dataset can represent a scan performed along a second direction different from (e.g., orthogonal to) the first direction. In some implementations, the auxiliary scan(s) (and auxiliary dataset(s) representing the auxiliary scan(s)) can be divided into subset(s) (and subset dataset(s)) that are based on portions of time (or time intervals) used to define the initial dataset. In other words, the auxiliary scan(s) or dataset(s) can be divided into subset datasets that are local in time (or over a time window that is smaller than the time window of the initial dataset), or can each be based on a subset of the time of the initial scan or dataset. In some implementations, although datapoints included in the subset dataset can be associated with a duration over a time period (e.g., multiple times), the subset dataset can be associated with a single time (e.g., an average time, a median time, a midpoint time) from the time period.

Said differently, the points from an auxiliary scan scanning mechanism are grouped into a series of shorter time intervals $P_n(x, y, z, t)$ (which can overlap with one another in time) within the overall scan period. Here n is the interval index and P is the set of points in that interval having locations (x, y, z, t) in space and time. The initial dataset and/or the subset dataset can be defined by the dataset module 120. The time interval used to define the subset datasets can be defined by the interval definition module 125.

The comparison of the initial dataset and the subset dataset(s) (which can be local in time) can include, or can be, a registration between the two. In some implementations, the comparison can include resampling the initial dataset (or a portion thereof) and the subset dataset (or a portion thereof) to, for example, a grid in Cartesian coordinates (e.g., in x and y). In some implementations, the resampling can be based on a Cartesian coordinate (such as a z value where the z value is valid). The resampling can be performed using the resampling module 135 shown in FIG. 1.

Said differently, the points of each shorter time interval $P_n$ are fit to the initial dataset (or 3D image) and offsets (position errors) $\Delta x(t)$, $\Delta y(t)$, $\Delta z(t)$, $\theta_x(t)$, $\theta_y(t)$, $\theta_z(t)$ can be calculated. The points can be collected for an interval whose midpoint is time t and the offsets assumed to apply to that midpoint time. In some implementations, a method for fitting the set of $P_n$ points to the global image is to interpolate (resample) both the global points and the $P_n$ points to the same regular grid in x and y coordinates.

In some implementations, the resampled initial dataset and the resampled subset dataset can be moved relative to one another in the x direction, the y direction, and the z rotation until a fit (e.g., a fit to a threshold, a fit to a root mean square (RMS) error) is found. In some implementations, the resampled initial dataset and the resampled subset dataset can be moved relative to one another in the x direction, the y direction, and the z rotation until a fit along the z direction is found. Said differently, RMS z deviation between the two resampled sets as the registration between the two resampled sets is varied in x, y and $\theta_z(t)$. The values for $\Delta x(t)$, $\Delta y(t)$, and $\Delta\theta_z(t)$ that minimize the RMS z deviation can be used to update velocity estimates as described below.

Based on the time variation of the offset measurements, target trajectory corrections may be estimated. The correction module 140 shown in FIG. 1 can be configured to define the corrections. For example, between time t1 and time t2:

$$V_x \text{error}(t2-t1) = (\Delta x(t2) - \Delta x(t1))/(t2-t1).$$

Similar calculations can be performed for the other 6DOF parameters.

The 6DOF transform may be corrected as a function of time and the corrected transforms used to correct both the initial dataset (and scan represented by the initial dataset) and shorter time interval 3D image points (e.g., subset datasets) mapped to time t. The process described above (or portions thereof) can be repeated multiple times or iteratively. In some implementations, the process can be iterated using the improved 3D image points.

Iterations of the method described above can be performed over subset datasets from the auxiliary scan. For example, a first processing iteration can be associated with a first subset dataset (associated with a first midpoint time) from the auxiliary dataset and a second processing iteration can be associated with a second subset dataset (associated with a second midpoint time different from the first midpoint time). An area of the object 10 covered by the first subset dataset can be different than an area of the object 10 covered by the second subset dataset.

In some implementations, results with LIDAR system 100 scanning can converge in a robust fashion. In some implementations of the LIDAR system 100, offsets Δx, Δy, etc. can become constant within the limits of measurement error and the actual systematic offset of position measurement from different scanning mechanisms. As noted above, the process can be applied to a LIDAR system 100 with a single scanning mechanism if the scanning is performed in a redundant fashion. As described above, the LIDAR system 100 can be configured to further refine motion and the initial image of the object 10 in six degrees of freedom (6DOF) after first order (real-time) estimates have been used to form the initial image of the object 10.

Figure 3:
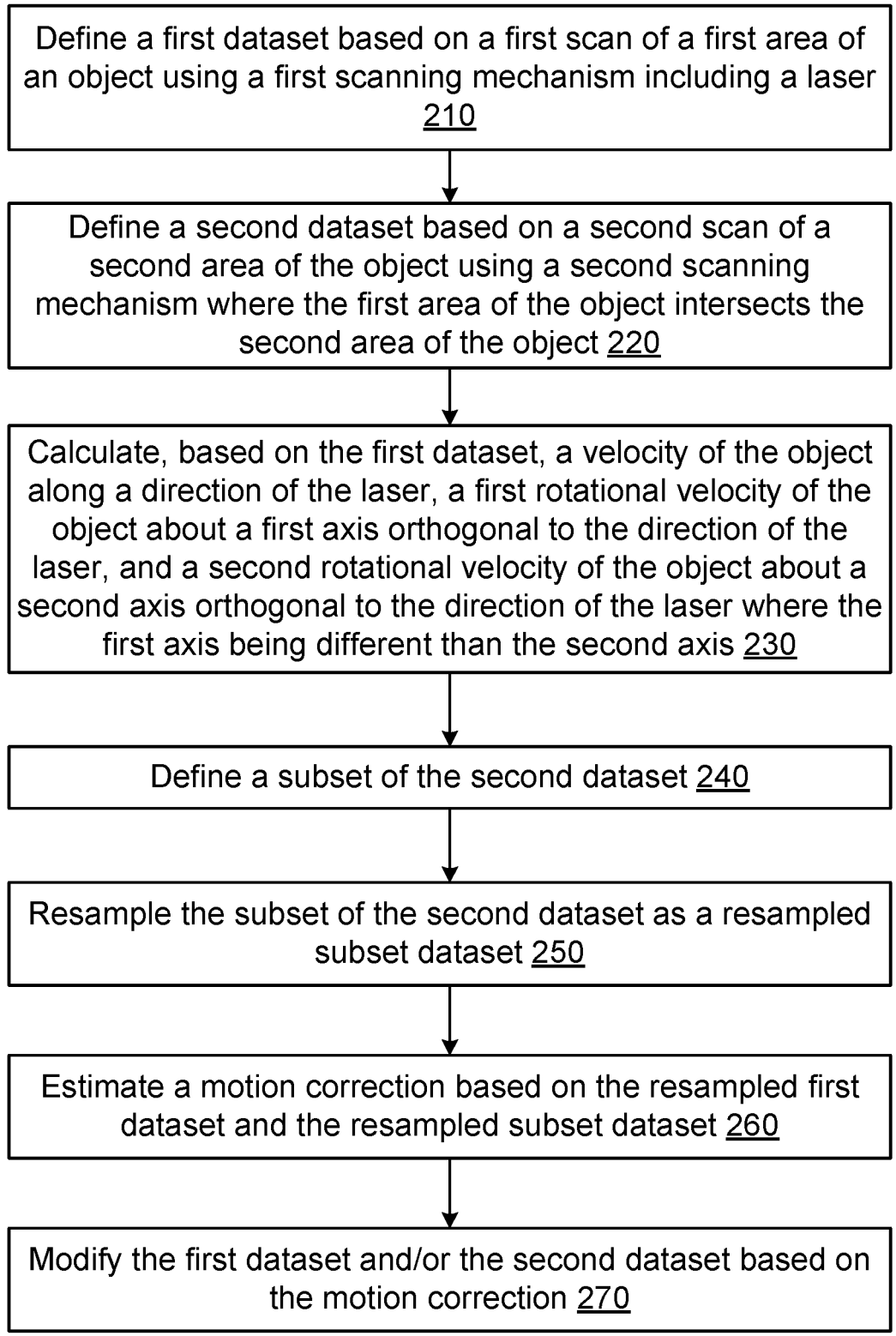
FIG. 3 is a flowchart that illustrates a method for calculating 6 degree of freedom (DOF) parameters according to an implementation.

FIG. 3 is a flowchart that illustrates a method for calculating 6DOF parameters according to an implementation. The flowchart can be performed using the LIDAR system 100 described above.

As shown in FIG. 3, a first dataset (e.g., initial dataset stored in the memory 150 shown in FIG. 1) is defined based on a first scan of an object using a first scanning mechanism and based on a first pattern (block 210). The first dataset can include an initial trajectory estimate. The first scan can be performed using, for example, the scanning mechanism 110A of the laser system 110 shown in FIG. 1. The first dataset can be defined by the dataset module 120 shown in FIG. 1.

A second dataset (e.g., auxiliary dataset stored in the memory 150 shown in FIG. 1) based on a second scan of a second area of the object using a second scanning mechanism is defined where the first area of the object intersects the second area of the object (block 220). The second scan be performed using, for example, the scanning mechanism 110A (or the scanning mechanism 110B) of the laser system 110 shown in FIG. 1. The second dataset can be defined by the dataset module 120 shown in FIG. 1. In some implementations, the second scan can be performed during a time period that overlaps the time period during which the first scan is performed.

A velocity of the object along a direction of the laser, a first rotational velocity of the object about a first axis orthogonal to the direction of the laser, and a second rotational velocity of the object about a second axis orthogonal to the direction of the laser are calculated based on the first dataset where the first axis being different than the second axis (block 230). The velocities noted above can be defined using the analyzing module 130 shown in FIG. 1.

A subset of the second dataset is defined (block 240). The subset of the second dataset can be defined using the interval definition module 125 and the subset can be associated with a particular time (that can be included in a time period during which the first scan is performed).

The subset of the second dataset is resampled as a resampled subset dataset (block 250). The resampled subset dataset can be defined using the resampling module 135 shown in FIG. 1.

A motion correction can be estimated based on the first dataset and the resampled subset dataset (block 260). The motion correction can be calculated using the correction module 140 shown in FIG. 1.

At least one of the first dataset or the second dataset can be modified based on the motion correction (block 270). The modification can be performed by the dataset module 120.

At least some portions of the process descried above can be performed iteratively. For example, blocks 240 through 270 can be performed iteratively on different subsets of the second dataset until convergence. Accordingly, the first dataset and/or the second dataset can be refined.

Figure 4:
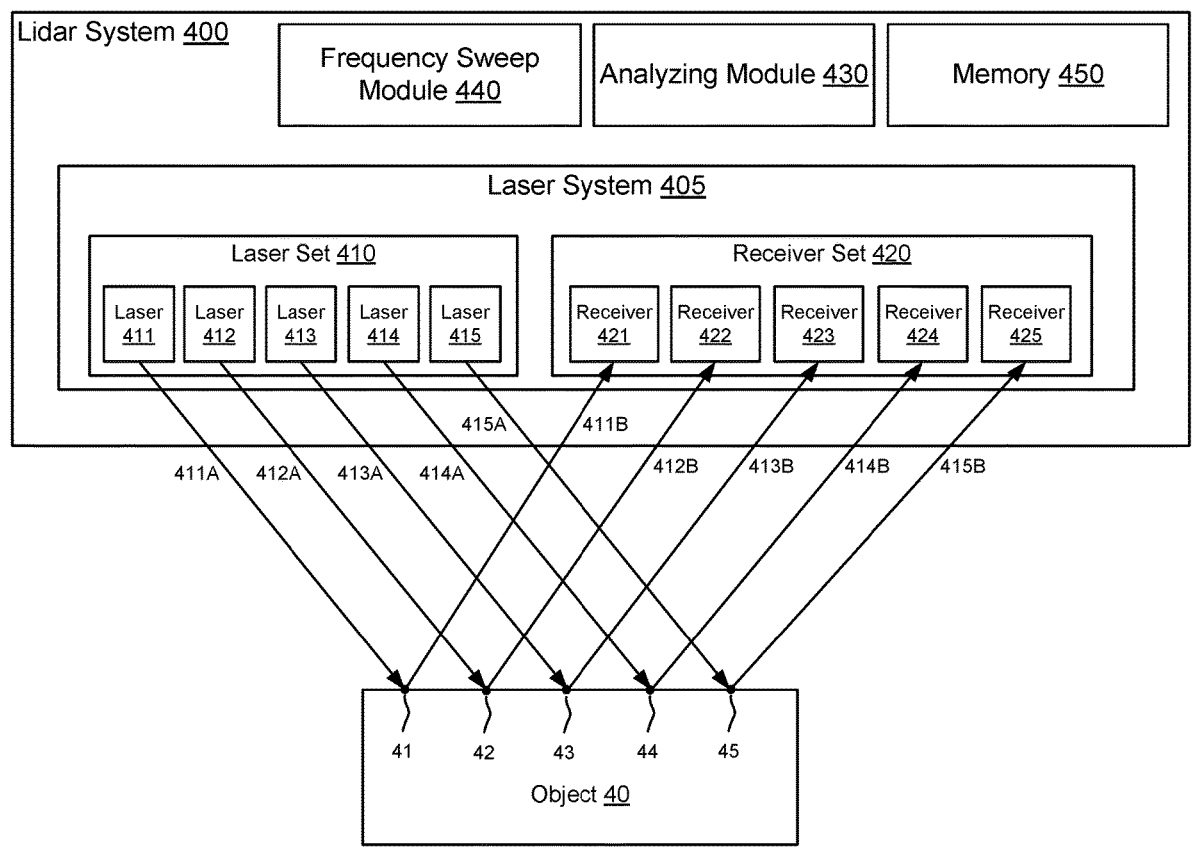
FIG. 4 is a schematic diagram that illustrates a LIDAR system according to an implementation.

FIG. 4 is a diagram that schematically illustrates a LIDAR system 400 according to an aspect. The LIDAR system 400 includes a laser system 405 and an analyzing module 430. The laser system 405 includes a laser set 410 and a receiver set 420.

The LIDAR system 400 is configured to track an object 40. For example, in some implementations, the LIDAR system 400 is configured to track the object 40 from time T1 to time T2. In some implementations, the LIDAR system 400 is configured to determine a rotation of the object 40 about an axis between time T1 and time T2. In some implementations, the LIDAR system 400 is configured to determine a rotation of the object 40 about at least two different axes. For example, in some implementations, the LIDAR system 400 is configured to determine a rotation of the object about at least two different axes that are perpendicular or orthogonal to one another between time T1 and time T2. In some implementations, the LIDAR system 400 is configured to determine a rotation of the object in the dark (or without the object being disposed within a light source such that the object is visible to the human eye). For example, in some implementations, the LIDAR system 400 is configured to determine a rotation of the object while the object is in a light field of less than 40 lumens.

In some implementations, the LIDAR system 400 is also configured to determine the movement of the object 40 between the time T1 and the time T2. For example, in some implementations, the LIDAR system 400 is configured to determine movement of an object 40 between time T1 and time T2 within a plane, such as an x-y plane. In some implementations, the LIDAR system 400 is configured to determine a rotation of the object in the dark (or without the object being disposed within a light source such that the object is visible to the human eye or a camera).

The object 40 may be of any shape or form. For example, in some implementations, the object 40 is a rigid, solid object. In some implementations, the object 40 is a human subject or individual or a portion of a body of a human subject or individual such as a head or a face of the human subject or individual. In some implementations, the object 40 can be referred to as a target or as a target object.

The LIDAR system 400 is configured to use the laser system 405 and the analyzing module 430 to produce or measure a range (or range estimates) and/or a velocity (or velocity estimate) of the object 40 that can be stationary or moving with respect to the LIDAR system 400. For example, in some implementations, the velocity that is produced or measured is the velocity in the direction of the radiation beam (as described in more detail below). In other words, the velocity that is measured is the velocity of the object towards or away from the LIDAR system 400. In some implementations, the range can be a range estimate and the velocity can be a velocity estimate. In some implementations the range can be an accurate range estimate and the velocity can be an accurate velocity estimate. In some implementations, the LIDAR system 400 is configured to produce accurate range estimates and/or accurate velocity estimates despite, for example, multipath effects associated with electromagnetic radiation from the lasers 410 and/or other interference that can arise during measurements.

In some implementations, the LIDAR system 400 is configured to use the laser system 405 and the analyzing module 430 to produce or measure a range and/or a velocity of various different points on the object 40. For example, in the illustrated implementation, the LIDAR system 400 is configured to produce or measure a range and/or a velocity of five points (or locations) 41, 42, 43, 44, and 45 on the object 40. In other implementations, the LIDAR system 400 is configured to produce or measure, at any given time, a range and/or a velocity of more than five points on the object. For example, the LIDAR system 400 may be configured to produce or measure a range and/or a velocity of sixteen points or more than sixteen points on the object.

The laser system 405 of the LIDAR system 400 includes a laser set 410. In the illustrated implementation, the laser set 410 is configured to emit or direct laser beams 411A, 412A, 413A, 414A, and 415A. In other implementations, the laser set 410 is configured to emit or direct less than 5 laser beams. For example, in one implementation, the laser set 410 is configured to emit or direct 4 laser beams. In yet other implementation, the laser set 410 is configured to emit between 4 and 16 laser beams. In further implementations, the laser set is configured to emit or direct more than 16 laser beams.

In the illustrated implementation, the laser set 410 includes lasers 411, 412, 413, 414, and 415 to emit or direct the laser beams. In other implementations, a single laser may be used to emit or direct the laser beams 411A, 412A, 413A, 414A, and 415A. In other implementations, the laser set 410 includes more or less than five lasers. For example, in some implementations, the laser set 410 includes at least 5 lasers. In other implementations, the laser set 410 includes at least 4 lasers. In other implementations, the laser set 410 includes between 5 and 16 lasers. In other implementations, the laser set 410 includes between 4 and 16 lasers. In yet other implementations, the set 410 includes more than 16 lasers.

Each of the lasers 411, 412, 413, 414, and 415 are configured to emit (e.g., produce, propagate) electromagnetic radiation at one or more frequencies that can be, for example, a coherent light emission (e.g., monochromatic light emission) or beam. In some implementations, the lasers are configured to emit (e.g., produce, propagate) a plurality of a coherent light emissions (e.g., monochromatic light emissions) or beams. The emissions from the lasers may be referred to as an electromagnetic radiation emission, as emitted electromagnetic radiation, or as transmitted electromagnetic radiation.

Specifically, each of the lasers of the laser system 405 is configured to emit (e.g., produce, propagate) a coherent light emission (e.g., monochromatic light emission) or beam from the LIDAR system 400 towards a point on the object 40. In some implementations, each of the lasers of the laser system 405 is configured to emit a light beam towards a different point on the object 40. In some implementations, the lasers of the laser system 405 of the laser system 405 are configured to emit or direct more than one light beam towards the object 40. For example, a single laser may be used to emit or direct a plurality (such as 4, 5, or more than 5) light beams towards different points on the object 40.

In the illustrated implementation, laser 411 is configured to emit light or electromagnetic radiation beam 411A towards point 41 on object 40. Laser 412 is configured to emit light or electromagnetic radiation beam 412A towards point 42 on object 40. Laser 413 is configured to emit light or electromagnetic radiation beam 413A towards point 43 on object 40. Laser 414 is configured to emit light or electromagnetic radiation beam 414A towards point 44 on object 40. Laser 415 is configured to emit light or electromagnetic radiation beam 415A towards point 45 on object 40.

The LIDAR system 400 may be any type of system that is configured to detect range and velocity of an object.

The laser system 405 of the LIDAR system 400 includes a receiver set 420. In the illustrated implementation, the receiver set 420 includes receiver 421, 422, 423, 424, and 425. In other implementations, the receiver set 420 includes more or less than five receivers. For example, in some implementations, the receiver set 420 includes at least 5 receivers. In other implementations, the receiver set 420 includes between 5 and 16 receivers. In yet other implementations, the receiver set 420 includes more than 16 receivers. In some implementations, the receiver set 420 includes a receiver for each laser in the laser set 410. In some implementations, the receiver set 420 includes a receiver for each laser beam that is emitted by the laser set 410. In some implementations, the receiver set 420 includes a receiver for each laser beam that is emitted by each laser of laser set 410. In some implementations, the receiver set 420 includes a receiver for each point or measurement location on the object 40 that is being observed.

Each of the receivers 421, 422, 423, 424, and 425 are configured to receive electromagnetic radiation reflected (also can be referred to as reflected electromagnetic radiation) from the object 40 in response to electromagnetic radiation emitted from the lasers toward the object 40. For example, in the illustrated implementation, receiver 421 is configured to receive electromagnetic radiation 411B that is reflected from point 41 of object 40. Receiver 422 is configured to receive electromagnetic radiation beam 412B that is reflected from point 42 of object 40. Receiver 423 is configured to receive electromagnetic radiation beam 413B that is reflected from point 43 of object 40. Receiver 424 is configured to receive electromagnetic radiation beam 414B that is reflected from point 44 of object 40. Receiver 425 is configured to receive electromagnetic radiation beam 415B that is reflected from point 45 of object 40.

The analyzing module 430 of the LIDAR system 400 is configured to analyze a combination of emitted electromagnetic radiation (e.g., emitted electromagnetic radiation beams 411A through 415A) from each of the lasers and reflected electromagnetic radiation (e.g., reflected electromagnetic radiation 411B through 415B) received by the each of the receivers. The emitted electromagnetic radiation can be emitted in accordance with a pattern including an up-chirp followed by a down-chirp (or a down-chirp followed by an up-chirp). The combination of a frequency of the emitted electromagnetic radiation from each of the lasers and a frequency of the reflected electromagnetic radiation received by the receivers can be analyzed by the analyzing module 430 to determine the range (distance from the LIDAR system) and velocity of each observed point of the object 40. Specifically, in the illustrated implementation, the LIDAR system 400 is configured to determine the range and/or the velocity for each of the points 41, 42, 43, 44, and 45 of object 40 from a first time T1 to a second time T2.

In some implementations, the LIDAR system 400 is configured to track, observe, or otherwise monitor each point 41, 42, 43, 44, and 45 on the object 40 about 100 times per second. In such implementations, the time difference between T1 and T2 is about 0.01 seconds. In other implementations, the LIDAR system 400 is configured to track or observe each point more frequently than 100 times per second, such as 1000 times per second or more. In some implementations, the LIDAR system 400 is configured to track or observe each point less than 100 times per second.

As will be discussed in more detail below, the analyzing module 430 is also configured to determine the rotation of the object and the distance and direction moved by the object between time T1 and time T2.

FIG. 5 is a schematic diagram of the analyzing module 430. The analyzing module 430 includes an image module 432, a comparison module 434, a rotation module 436, and a distance module 438. The image module 432 is configured to acquire a three-dimensional image of the object 40. In some cases, the object 40 is a known object or subject, such as a known person. In such cases, the object 40 has a known three-dimensional structure and the image module 432 can acquire the structure from a database, a memory, or from any other storage device or memory device 439. In some implementations, the three-dimensional structure of the object may be provided to the image module 432 from the database, memory, or other storage or memory device 439. In some implementations, the database, memory, or other storage device is local to the analyzing module 430. In other implementations, the three-dimensional structure may be received by the analyzing module 430 from a remote storage device, such as via the internet or an intranet.

In some cases, the object 40 does not have a known three-dimensional structure. In such cases, the image module 432 is configured to create a three-dimensional structure of the object using data received from the laser system 410. For example, the image module 432 may create the three-dimensional structure of the object 40 (or a three-dimensional structure of a portion of the object 40) using the range data produced by, for example, the laser system 405.

The comparison module 434 is configured to determine the range and/or the velocity of the object 40. More specifically, the comparison module 434 is configured to determine the range and/or the velocity of various points (such as 41, 42, 43, 44, and 45) of the object 40. As described above, in one implementation, the comparison module 434 is configured to analyze a combination of emitted electromagnetic radiation from each of the lasers and reflected electromagnetic radiation received by each of the receivers to determine the range and/or the velocity for points 41, 42, 43, 44, and 45 of object 40 from a first time T1 to a second time T2.

The rotation module 436 is configured to determine a rotation of the object 40. In some implementations, the rotation module 436 is configured to determine a rotation of the object 40 about more than one axis. For example, in some implementations, the rotational module 436 is configured to determine the rotation of the object 40 about two axes that are non-parallel (e.g., orthogonal) to each other. For example, in one implementation, the laser system is configured to emit radiation towards the object 40 along an axis (Z axis) and the rotation module 436 is configured to determine the rotation of the object about a first axis that is orthogonal to the Z axis (the X axis) and a second axis that is orthogonal to the Z axis (the Y axis). In some implementations, the rotation module 436 is configured to determine the amount of rotation of the object between a first time T1 and a second time T2.

In some implantations, for a rigid solid object, the velocity field component in one Cartesian direction, will vary linearly in the spatial coordinates orthogonal to that direction. Also, there will be no variation of that component in the spatial direction of the component. For example, consider the velocity component in the z-direction, Vz. At any given time there can be no variation of Vz in the z direction or the object would be stretching, violating the definition of a rigid solid body. If one investigates the trigonometry/vector analysis of z motions caused by the rotational components Wx, Wy, and Wz, one sees that, for each rotational component, the motion Vz may be described by a linear equation:

$$Vz=Vz(x,y)=A*x+B*y+C, \text{ where } A, B \text{ and } C \text{ are constants at a given time.}$$

where,
A=−Wy,
B=Wx, and
C depends on the location of the origin of the coordinate system.
Wz imparts no z-component of velocity.

Therefore, at a given time, if the velocity Vz at a number of (x, y) positions (for example, a number of points on the object 40) are measured, then the values Wx, Wy, and the translational constant velocity C=Vz0 may be solved for with a set of linear equations. In some implementations, there are enough spatial (x, y) points that the linear equation are substantially over determined.

The distance module 438 is configured to determine how far the object 40 has traveled in the x-y plane. For example, in some implementations, the distance module 438 is configured to determine how far the object 40 has traveled between time T1 and time T2 within an x-y plane that is orthogonal to the z axis (the axis of the radiation beams of the laser system 405).

In some implementations, with object orientation known, the slopes dz/dx and dz/dy are known as a function of (x, y) position on the object. The array of LIDAR range values (as determined by the laser system 405) may be used to determine the slope pair (dz/dx, dz/dy) at a number of points (x, y). For example, in some implementations, a slope and/or curvature of the surface of the object may be determined in each of the x direction and the y direction to acquire slope and/or curvature gradients. For some surfaces, object orientation information, plus a slope pair uniquely determine a position on the surface of the object. For example, for a complex surface, such as a face of a person or individual, a slope pair will likely determine a location uniquely in a local region even though the same slope pair may be found more than once on the whole face. In some implementations, a plurality of slope pairs will estimate position redundantly and can be used to reduce error in position estimation from noisy range data.

With absolute LIDAR beam positions on the object estimated from slope pairs and a current rotated object model available, the distance module 438 may determine the position change of the object 40. For example, the rotation of the object (as determined or calculated) may be reversed, removed, or backed out (such that the object is returned to its original orientation). A determination of the beam position change necessary to restore the beams to their desired location may also be made. The translational velocity (dx/dt, dy/dt) may then be determined using the position location data of the object. In some implementations, with the target rotational and translational velocities known, beam relocation can be done so that beam motion is smooth and beam location is close to the desired position at future points in time.

In some implementations, a relatively small number of beam points may be necessary to maintain position without scanning. In some implementations, the position may be maintained without scanning and the LIDAR system may be used to monitor vibrations.

The components (e.g., modules, processors (e.g., a processor defined within a substrate such as a silicon substrate)) of the LIDAR system 400 (e.g., the analyzing module 430) can be configured to operate based on one or more platforms (e.g., one or more similar or different platforms) that can include one or more types of hardware, software, firmware, operating systems, runtime libraries, and/or so forth. In some implementations, the components of the LIDAR system 400 can be configured to operate within a cluster of devices (e.g., a server farm).

In some implementations, one or more portions of the components shown in the LIDAR system 400 in FIG. 4 and/or FIG. 5 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the LIDAR system 400 can be, or can include, a software module configured for execution by at least one processor (not shown). In some implementations, the functionality of the components can be included in different modules and/or different components than those shown in FIG. 4 and/or FIG. 5.

In some implementations, one or more of the components of the LIDAR system 400 can be, or can include, processors configured to process instructions stored in a memory. For example, the analyzing module 430 (and/or a portion thereof) can be a combination of a processor and a memory configured to execute instructions related to a process to implement one or more functions.

Although not shown, in some implementations, the components of the LIDAR system 400 (or portions thereof) can be configured to operate within, for example, a data center (e.g., a cloud computing environment), a computer system, one or more server/host devices, and/or so forth. In some implementations, the components of the LIDAR system 400 (or portions thereof) can be configured to operate within a network. Thus, the LIDAR system 400 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, the LIDAR system 400 may include a memory. The memory can be any type of memory such as a random-access memory, a disk drive memory, flash memory, and/or so forth. In some implementations, the memory can be implemented as more than one memory component (e.g., more than one RAM component or disk drive memory) associated with the components of the LIDAR system 400.

As best illustrated in FIGS. 6 and 7, in one implementation, an object 80 may be observed by (e.g., targeted by) the LIDAR system 400. The object 80 may have any shape, but is represented in FIGS. 6 and 7 as a circle. In FIG. 6, at time T1 a point 82 on the object 80 is being observed by the LIDAR system 400. At time T1 the point 82 is located at (3,3) in the x,y plane. As illustrated in FIG. 7, at time T2 the point 82 is located at (4,3) in the x,y plane. The movement of the point may be the result of different types of movements of the object 80. For example, the object 80 may have moved from one location to another (translational movement) or the object 80 may have rotated (for example, about an axis parallel to the y axis of the x-y plane).

Figure 8:
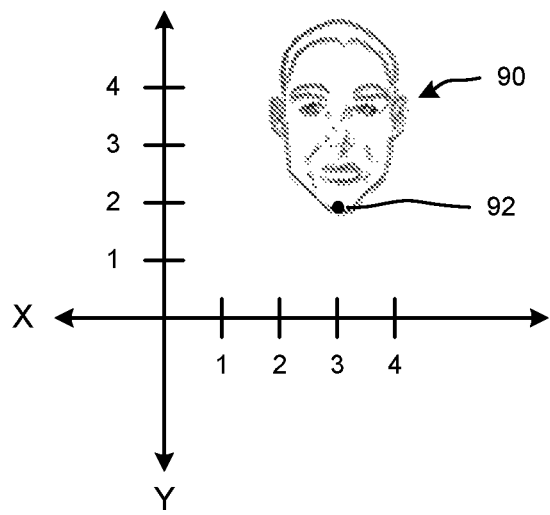
FIGS. 8 through 10 illustrate another object that may be tracked according to an implementation.
Figure 9:
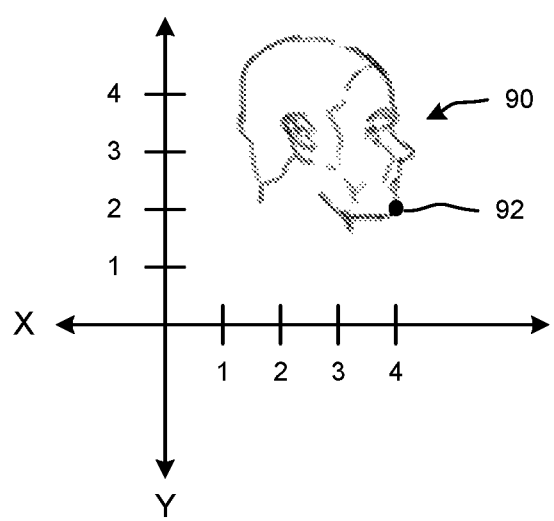
Figure 10:
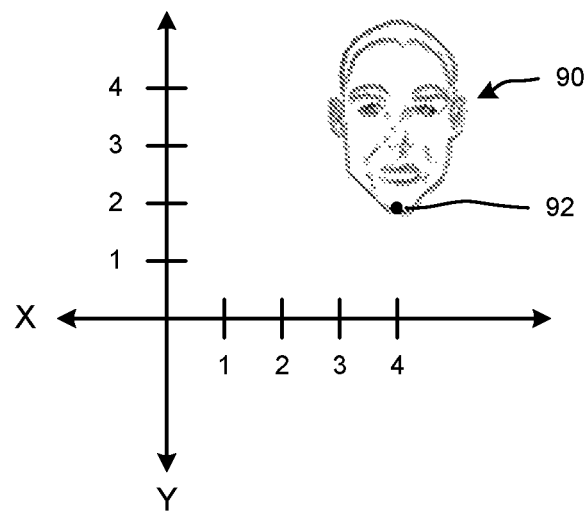

As illustrated in FIGS. 8, 9, and 10 a head or face 90 of an individual may be tracked or observed by the LIDAR system 400. Specifically, a point or location 92 of the head or face 90 may be observed. As illustrated in FIG. 8, at time T1 the point 92 is located at (3,2) in the x-y plane. At time T2 the point 92 may be observed to be at (4,2). The movement of the point may be the result of different types of motion. For example, the person or individual may have rotated their head (for example, about an axis parallel to the y axis), as illustrated in FIG. 9. Alternatively, the person or individual may have moved their head (without any rotation), as illustrated in FIG. 10.

As described above, by observing the range and velocity of several points on the object, the rotation module 436 is configured to determine the rotations of the object. Once the rotation of the object is known, as describe above, the distance module 438 is configured to determine how far the object has moved in the x-y plane. Accordingly, in one implementation, the LIDAR system 400 is configured to determine if a person's face or head is oriented as illustrated in FIG. 9 at time T2 or as illustrated in FIG. 10 at time T2.

Figure 11:
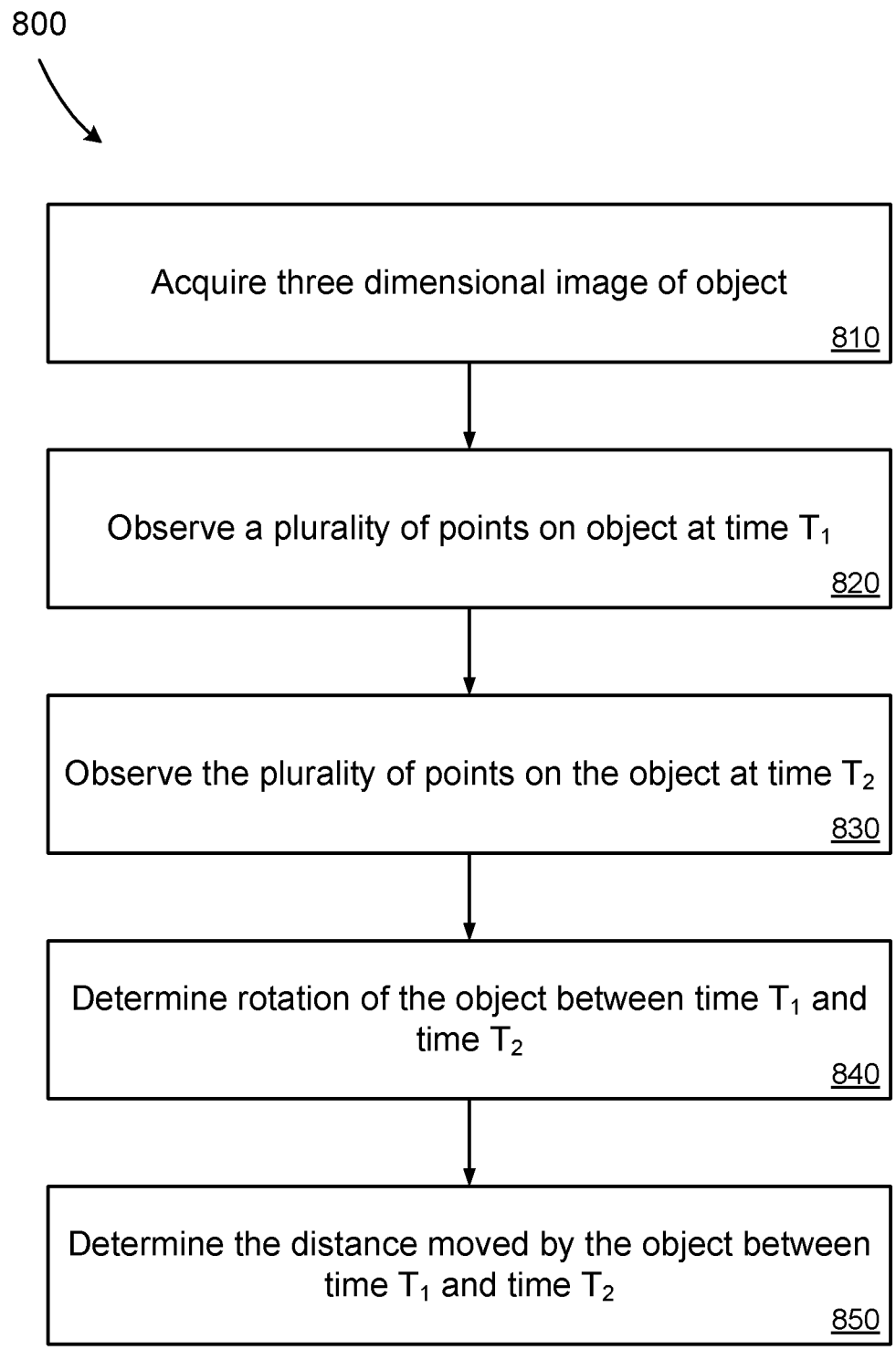
FIG. 11 is a flow chart that illustrates a method of tracking an object according to an implementation.

FIG. 11 is a flow chart of a method 1100 according to an implementation of the invention. The method 1100 may be used to determine the rotation and/or motion (or distance moved) by an object between a first time T1 and a second time T2. The method 1100 may be used many times consecutively to determine the rotation or motion of an object over a long period of time. For example, the method may be used hundreds of times a second to track or monitor an object.

At 1110, a three-dimensional image of the object is acquired. For example, in some implementations, an image module, such as image module 432 (shown in FIG. 5), may acquire the three-dimensional image of the object (if the object is a known object) from a database or other resource. In other implementations, the image module 432 may acquire the three-dimensional image of the object (or a portion of the object) by using scanning information from the laser system 405 (shown in FIG. 4) to develop a three-dimensional image of the object (or a portion of the object).

At 1120, a plurality of points on the object are observed at a first time T1. For example, in some implementations, the laser system 405 may observe and detect a range and/or a velocity of each of the plurality of points on the object. For example, in some implementations, five points on the object are observed at any given time. In other implementations, more than five points are observed. For example, between 5 and 16 points may be observed. In other implementations, more than 16 points are observed.

As discussed above, the laser system 405 may observe the plurality of points by emitting beams of radiation and receiving the reflection of such radiation by each of the plurality of points on the object. As discussed above, a comparison of the emitted radiation and the reflected radiation may provide the range and/or velocity in the z direction (the direction of the radiation beam) of the object.

At 1130, the plurality of points (or points that are substantially located at the same location as the plurality of points) are observed at a second time T2. In some implementations, the same points on the on the object are identified by an analysis or comparison of the three-dimensional image (either the known or system developed three-dimensional image). The second time T2 is different than the first time T1. In some implementations, the second time T2 is later in time than the first time T1. The plurality of points may be observed by the laser system 405 as described above.

At 1140, the rotation of the object between the time T1 and the time T2 is determined. For example, in some implementations, as described above a rotation module 436 may be configured to analyze the range and velocity information and determine the rotation of the object. In some implementations, the rotation of the object about one axis is determined. In some implementations, the rotation of the object about at least two axes that are orthogonal to each other are determined. Is some implementations, the rotation of the object about two axis that are orthogonal to the z axis (the direction or axis of the beam of radiation) is determined.

At 1150, the distance and/or direction moved by the object between time T1 and time T2 is determined. For example, in some implementations, the motion of the object in an x-y plane that is orthogonal to the z axis (the axis of the beam of radiation) is determined. As described above, the distance module 438 may determine the motion or distance moved by the object in the x-y plane through the rotation determination and the slope of the portion of the object that is being observed. Specifically, the unique portion of the object that is being observed may be identified by the slope or a slope analysis of the object. The location of the portion of the object may be specified. The location of the point or location along with the rotation data may result in a determination of motion of the object in the x-y plane. In some implementations, the rotation that is determined or observed may be backed out or removed such that the object is disposed in the same orientation at T2 as it was at T1. The uniquely identified points on the object may then be identified and it can be determined how far such points have moved in the x-y plane (for example, how far in the x direction and how far in the y direction). In some embodiments, closely-spaced LIDAR beams with a repeated scan cycle may be used to detect target motion normal to beam direction. If the beams are close enough, the range to the surface may be approximated as a linear function of the distance between the beams. As discussed in detail above, the position of the object or target 40 is already corrected for Vz (velocity in the z direction), Wx (rotation about the x axis) and Wy (rotation about the y axis) motion using multi point lidar information, motion due to Vx, Vy, and Wz may be determined. As discussed in detail below, each of those motions may be determined separately.

In some implementations, a LIDAR system includes a laser system that includes lasers or laser beams that are configured to move in a pattern or patterns with respect to the object that is being tracked. For example, in some implementations, the laser system 405 of the LIDAR system 400 includes a plurality of lasers or beams that are configured to move in a pattern or patterns with respect to the object being tracked.

For example, in some implementations, the LIDAR system 400 may have one mode in which the laser beams are fixed or stationary and a second mode in which the laser beams move in a pattern or patterns such as a shape. In some implementations, two or more of the laser beams move in a pattern or patterns when the LIDAR system is in the second mode. In some implementations, different laser beams may move independently in different patterns.

In other implementations, the LIDAR system 400 includes some lasers or produces some laser beams that are stationary and some that are configured to move in a pattern (or patterns) or shape.

The lasers or beams can move in any pattern or shape. For example, in some implementations, the lasers or beams are configured to move in elliptical shape. In other implementations, the lasers or beams are configured to move in a line, circle, square, rectangle, triangle, or any other shape. In some implementations, the shape or pattern that the lasers or beams move in are dictated or determined by the object that is being tracked. For example, in some implementations, the pattern or shape of the laser movement may be similar to the shape of the object that is being tracked. For example, an elliptical shape or pattern may be used when tracking a face of an individual as the face of an individual is generally elliptical in shape.

In some implementations, the analyzing module 430 (such as the distance module 438 of the analyzing module 430) is configured to determine the distance moved and/or the velocity of the object 40. For example, the analyzing module 430 may determine or calculate the distance moved by the object in directions normal or orthogonal to the direction of the laser beam motion.

In one implementation, while the laser beams are moving in one direction along their pattern or shape, the analyzing module 430 is configured to detect motion (distance and/or velocity) of the object 40 in a direction parallel to the direction that the laser beams are moving and in a direction perpendicular to the direction that the beams are moving. In some embodiments, the analyzing module 430 is also configured to detect or determine rotation of the object about an axis parallel to the laser beams (the Z direction).

In some implementations, the laser beams that are moving along a pattern or shape are disposed on or hit the target at a very small distance from each other. In other words, the beams are closely-spaced. In some implementations, the beams are less than a few centimeters from each other. In other implementations, the beams are less than a few millimeters from each other.

The velocity of the object 40 in an x direction (Vx or also referred to as vx) may be determined as follows. The plurality of points measured during the time period are used to calculate and remove object motion in z, Wx and Wy, as described above. A pair of LIDAR (or laser) beams are in a repeated scan pattern, with index (k), (an ellipse, for example) there will be a portion of the scan cycle in which most of the motion of the beams is mostly in the y-direction. In some implementations, the two beams have the same pointing device which, at a given range, will maintain approximately the same lateral separation $\Delta x$ and will have, at a given time, approximately the same vertical y position ($y1 \approx y2 \approx y$). The range of the target and lateral position of the beam are sampled with index (j). For each of the two beams the series of measured points $(x1(j), y1(j), z1(j))$ and $(x2(j), y2(j), z2(j))$ is sampling a surface $z(x, y)$. If the slope of the target surface is approximated as linear, this slope $dz/dx$ is measured at each y as:

$$dz/dx(j)=dz/dx(y(j))=(z2(j)-z1(j))/(x2(j)-x1(j))=(z2(j)-z1(j))/\Delta x.$$

On a subsequent scan cycle the beam will revisit each y position at approximately the same delay Tcycle from the time of its previous visit to that y position. On a repeated scan cycle the target may have moved in the x-direction. If the target moves a distance δx=vx*Tcycle during the cycle period, we will have $$z1(y,k+1)=z1(y,k)-dz/dx(y,k)*\delta x, \text{ or}$$

$$[z1(y,k+1)-z1(y,k)]*[x2(y,k)-x1(y,k)]=-[z2(y,k)-z1(y,k)]*\delta x$$

At each delay Tcycle there is an estimated error, e, for each sample (j) in cycle (k):

$$ex(j)=[z1(y(m),k+1)-z1(y(j),k)]*[x2(y(j),k)-x1(y(j),k)]+[z2(y(j),k)-z1(y(j),k)]*\delta x(l,j),$$

where y(m) is the sample in cycle (k+1) with the value closest to y(j) in cycle (k). In some implementations, it is desirable to minimize the error Ex=sum (ex(j)*ex(j)). Accordingly, in some cases, the delay Tcycle that corresponds or correlates to the least amount of error may be selected and used.

Alternatively, z1(y, k+1) may be an interpolated value using z1(y(m), k+1) and z1(y(m±1, k+1). If we assume that Tcycle is approximately constant over the set of paired samples j and m and that there is no appreciable acceleration (or change in velocity) in the x direction (for example, because the Tcycle is a very short time period), then δx will be constant for the various j and m pairs and we can implement a standard least-squares solution for δx. In other implementations, a different solution for δx may be used.

The following solution results.

$$A_x = \delta x/\Delta x$$
$$= \frac{\text{sum}([z1(y(m), k + 1) - z1(y(j), k)] * [z2(y(j), k) - z1(yj(j), k)])}{\text{sum}(z2(y(j), k) - z1(y(j), k)] * ([z2(y(j), k) - z1(y(j), k)])}$$

Then, $vx=\delta x/Tcycle=A_x*\Delta x/Tcycle$

We can also make the approximation that the x component of the object or target velocity, vx, is constant for a scan cycle. If this approximation does not hold we can introduce an acceleration term ax, so that $$vx=vx(0)+ax*Tcycle.$$

and solve for both vx0 and ax.

If the beam moves an x-distance ΔXbeam between scan cycles, this beam offset may be corrected for by adjusting the z value in the subsequent scan cycle for the beam position change to obtain the measurement that would have been made at the (x(j), y(j)) position of the previous scan cycle $$z1\text{adjusted}(y(m),k+1)=z1(y(m),k+1)-dz/dx(y(j),k)*\Delta X\text{beam}.$$

With this adjustment made, the least squares solution for vx proceeds as before.

Similarly, velocity in the y direction (Vy or also referred to as vy) may be determined as follows. There will be a portion of the scan cycle in which most of the motion of the beams is mostly in the x-direction. During such scan cycle segment in the x direction we can minimize the error $$Ey=\text{sum}(ey(j)*ey(j)), \text{ where}$$

$$ey(j)=z1(y(j)-vy*Tcycle,k)-z1(y(m),k+1).$$

In some cases this approach may work well even if there is a progressive line scan because of the similarity in surface shape for closely-spaced scan lines.

Rotation about the Z axis (Wz or also referred to as wz) may be determined because it will introduce a linear gradient in the observed value of vx and vy that occur for each scan cycle. A non-zero value of wz will result in a line gradient of vx as a function of y and vy as a function of x. Additional terms can be added to the least squares solutions for vx and vy to obtain also wz. Also, multiple beams may be used in the determination. For example, a solution for vy may be determined at different x values, using the method above, the gradient of vy with x yields ωz:

$$vy2=vy1-\omega z*(x2-x1).$$

$$\omega z=(vy2-vy1)/(x2-x1).$$

In some implementations, calculations or determinations may be made when the Tcycle is not constant. Additionally, in some cases, calculations or determinations may be made when the beam spacing is not constant or consistent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a liquid crystal display (LCD or LED) monitor, a touchscreen display, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

In some implementations, the LIDAR system may achieve millimeter range accuracy performance off moving faces of a subject or individual. However, in some implementations, solid object velocity estimation requires processing of multiples samples in order to remove significant velocity components from speech and other biological components. A 500 Hz vibration with an amplitude of 0.05 mm (50 microns) will have a maximum velocity of (2*pi*500*5E−5=0.157 m/sec) about 16 cm/sec. Even though the amplitude of the vibration is an insignificant range change for the process of tracking faces of a subject or individual, the instantaneous velocity may be significant and the vibrational velocity may be removed. In some implementations, removing vibrational velocity may require processing a velocity data sample significantly longer than the periods of the vibrations to be removed and care to avoid noise or bias. For example, noise in the velocity (for example, velocity in the Z direction) can affect or degrade the ability to detect or determine the rotation of the object or the Z velocity of the object. In some implementations, the vibration or velocity noise is relatively small and can be averaged out to remove its effects.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What may be claimed is:

1. A method, comprising:
 defining a first dataset based on a first scan of a first area of an object using a first scanning mechanism including a laser;
 defining a second dataset based on a second scan of a second area of the object using a second scanning mechanism, the first area of the object intersecting the second area of the object, the second scan being performed during a time period that overlaps the time period during which the first scan is performed;
 calculating, based on the first dataset, a velocity of the object along a direction of the laser, a first rotational velocity of the object about a first axis orthogonal to the direction of the laser, and a second rotational velocity of the object about a second axis orthogonal to the direction of the laser, the first axis being different than the second axis;
 defining a subset of the second dataset;
 resampling the subset of the second dataset as a resampled subset dataset; and
 estimating a motion correction based on the first dataset and the resampled subset dataset; and
 modifying at least one of the first dataset or the second dataset based on the motion correction.

2. The method of claim 1, further comprising:
 resampling at least a portion of the first dataset as a resampled first dataset,
 the estimating the motion correction is based on the resampled first dataset and the resampled subset dataset.

3. The method of claim 1, wherein the calculating based on velocity information from the first dataset and the second dataset.

4. The method of claim 1, wherein the first scan is based on a first pattern and the second scan is based on a second pattern different from the first pattern.

5. The method of claim 4, wherein the first pattern is aligned along a direction orthogonal to a direction along which the second pattern is aligned.

6. The method of claim 1, wherein the resampling the at least the portion of the first dataset and the resampling the subset of the second dataset is based on a common coordinate system.

7. The method of claim 1, wherein the estimating is performed based on a comparison of datapoints along a direction that is substantially orthogonal to a plane along which the resampling the at least the portion of the first dataset and the resampling the subset of the second dataset are performed.

8. The method of claim 1, wherein the subset is a first subset, the defining the first subset of the second dataset is performed during a first iteration, the second dataset includes a datapoint modified using motion correction, the method further comprising:
 defining a second subset of the second dataset including the modified datapoint during a second iteration.

9. The method of claim 1, wherein the motion correction is associated with a velocity of the object along a direction orthogonal to the direction of the laser.

10. The method of claim 1, wherein the motion correction is associated with a velocity of the object along a plurality of directions that are each orthogonal to the direction of the laser.

11. The method of claim 1, wherein the motion correction is associated with a rotation of the object along the direction of the laser.

12. An apparatus, comprising:
 a first scanning mechanism including a laser configured to perform a first scan of an object based on a first pattern;
 a second scanning mechanism configured to perform a second scan of the object based on a second pattern different from the first pattern;

a dataset module configured to define a first dataset based on the first scan and a subset of a second dataset based on the second scan;

a resampling module configured to resample at least a portion of the first dataset and the subset of the second dataset; and a correction module configured to estimate a motion correction based on the resampling of the at least the portion of the first dataset and the subset of the second dataset.

13. The apparatus of claim 12, wherein the first scan is associated with a first area of the object that intersects a second area of the object associated with the second scan.

14. The apparatus of claim 13, wherein the first scan is performed during a time period that overlaps with a time period during which the second scan is performed.

15. The apparatus of claim 13, wherein the resampling of the at least the portion of the first dataset and the subset of the second dataset is based on a common coordinate system.

16. The apparatus of claim 13, wherein the first dataset is corrected before the resampling of the at least a portion of the first dataset using an initial motion estimate including a velocity in a z-direction, a rotational velocity about an x-axis, and a rotational velocity about a y-axis.

17. A method, comprising:

defining a first dataset based on a first scan of a first area of an object using a first scanning mechanism including a laser and based on a first pattern;

defining a second dataset based on a second scan of a second area of the object using a second scanning mechanism and based on a second pattern different from the first pattern, the first area of the object intersecting the second area of the object; and estimating a velocity of the object along a first direction orthogonal to a direction the laser, a velocity of the object along a second direction orthogonal to the direction of the laser, and a rotation of the object along the direction of the laser based on a comparison of the first dataset and a subset of the second dataset.

18. The method of claim 17, wherein the estimating is performed iteratively within mutually exclusive time windows.

19. The method of claim 17, wherein the estimating is performed iteratively using different subsets of the second dataset.

20. The method of claim 17, wherein the estimating is based on registration between the first dataset and the subset of the second dataset.

* * * * *